United States Patent
Takagi et al.

(10) Patent No.: US 7,030,933 B2
(45) Date of Patent: Apr. 18, 2006

(54) BROADCAST RECEIVING SYSTEM WITH FUNCTION OF ON-SCREEN DISPLAYING CHANNEL INFORMATION

(75) Inventors: Toshihiro Takagi, Takatsuki (JP); Manabu Yamamoto, Mukou (JP); Yasuhiro Inui, Yao (JP); Yusuke Nishida, Ikoma (JP)

(73) Assignee: Funai Electric Co., Ltd., Daito (JP)

( * ) Notice: Subject to any disclaimer, the term of this patent is extended or adjusted under 35 U.S.C. 154(b) by 523 days.

(21) Appl. No.: 10/053,605

(22) Filed: Jan. 24, 2002

(65) Prior Publication Data

US 2002/0097340 A1 Jul. 25, 2002

(30) Foreign Application Priority Data

Jan. 25, 2001 (JP) ............................. 2001-016519

(51) Int. Cl.
    *H04N 5/50* (2006.01)
(52) U.S. Cl. .................. 348/569; 563/564; 563/570; 563/473; 563/732
(58) Field of Classification Search ............ 348/385.1, 348/388.1, 553–554, 563–564, 569–570, 348/589, 720, 725, 731, 732, 468, 473, 474, 348/487; 725/40, 52, 54, 142, 152; H04N 5/50
See application file for complete search history.

(56) References Cited

U.S. PATENT DOCUMENTS

| | | | | |
|---|---|---|---|---|
| 5,200,823 A * | 4/1993 | Yoneda et al. | ............... | 348/473 |
| 5,485,221 A * | 1/1996 | Banker et al. | ............... | 348/563 |
| 5,600,378 A * | 2/1997 | Wasilewski | ................. | 348/468 |
| 5,914,746 A * | 6/1999 | Matthews et al. | ........... | 725/132 |
| 6,031,577 A * | 2/2000 | Ozkan et al. | ................ | 348/465 |
| 6,084,643 A * | 7/2000 | Kishtaka et al. | ............. | 348/725 |
| 6,104,436 A * | 8/2000 | Lee | .............................. | 348/563 |
| 6,133,910 A * | 10/2000 | Stinebruner | ................... | 725/49 |
| 6,137,539 A * | 10/2000 | Lownes et al. | .............. | 348/569 |
| 6,249,320 B1 * | 6/2001 | Schneidewend et al. | ..... | 348/569 |
| 6,313,886 B1 * | 11/2001 | Sugiyama | .................... | 348/731 |
| 6,501,514 B1 * | 12/2002 | Townsend et al. | ........... | 348/734 |
| 6,598,233 B1 * | 7/2003 | Choi | ........................... | 725/151 |
| 6,661,472 B1 * | 12/2003 | Shintani et al. | .............. | 348/732 |
| 6,700,624 B1 * | 3/2004 | Yun | .............................. | 348/555 |
| 6,731,345 B1 * | 5/2004 | Lee | .............................. | 348/553 |
| 6,817,027 B1 * | 11/2004 | Curreri | ......................... | 725/28 |
| 6,839,903 B1 * | 1/2005 | Shintani et al. | ............... | 725/39 |
| 2002/0052864 A1 * | 5/2002 | Yamamoto | ..................... | 707/1 |
| 2002/0075408 A1 * | 6/2002 | Curreri | ........................ | 348/569 |
| 2003/0179320 A1 * | 9/2003 | Kim | ............................ | 348/732 |
| 2004/0080672 A1 * | 4/2004 | Kessler et al. | .............. | 348/553 |

FOREIGN PATENT DOCUMENTS

| JP | 64-007786 | 1/1989 |
|---|---|---|
| JP | 64-089871 | 4/1989 |

* cited by examiner

*Primary Examiner*—Brian P Yenke
(74) *Attorney, Agent, or Firm*—Crowell & Moring LLP

(57) ABSTRACT

In a broadcast receiving system for receiving the digital broadcast, when the selection of "channel selection menu" is inputted by the user, the channel information stored in a memory is read to decide whether the configuration of a sub-channel is identified during the current operation, and a descriptor "x" is assigned to the sub-channel not identified to be made displayed in the channel information list on "channel selection display," thereby distinguishing it from other channels. This allows the channel whose sub-channel cannot be identified to be OSD displayed distinguishing it from other channels such as for analog broadcast and the like.

6 Claims, 5 Drawing Sheets

FIG. 3

CHANNEL SELECTION DISPLAY IN DIGITAL/ANALOG BROADCASTING RECEIVER

CHANNEL ADDITION MENU

MAIN CHANNEL  SUB-CHANNEL

| CH | STATION | Digital/Analog | | Contents |
|---|---|---|---|---|
| 2-0 | CNN | NTSC | | TV-Program |
| 2-x | CNN | ATSC | DTV | |
| 4-0 | BBC | NTSC | | TV-Program |
| 4-1 | BBC | ATSC | DTV | DATA Program |
| 4-2 | BBC | ATSC | DTV | Weather Information |

ATSC CHANNEL IN WHICH MAIN CHANNEL IS "2" WITH SUB-CHANNEL NOT DESIGNATED

BROADCAST RECEIVING SYSTEM WITH FUNCTION OF ON-SCREEN DISPLAYING CHANNEL INFORMATION

BACKGROUND OF THE INVENTION

The present invention relates to a broadcast receiving system with a function of on-screen displaying channel information of receivable digital/analog broadcasts.

Conventionally, in the television broadcast, in addition to the image broadcast, there has been commercially applied a multi-teletext broadcast which is performed by multiplexing the multi-teletext broadcast during a period of the vertical retrace line for image signals. In the multi-teletext broadcast, it takes a time from the channel selection to the display of desired information, so that various devices have been made. By way of example, in the multi-teletext broadcast, there is a teletext broadcast receiver which displays the channel information stored in memory on the display device to permit the user to select a program he wants to see and hear, thereby allowing the user to select easily the program (for example, see Japanese Unexamined Patent Publication No. 64-7786). In the multi-teletext broadcast, there is also a teletext broadcast receiver which receives the teletext broadcast from a broadcasting station to store the received information on a memory, then automatically and sequentially select other stations to store the received information on the memory at predetermined time intervals, and to make sequentially the received information thus stored audiovisual, thereby reducing a time required to obtain the desired information (for example, see Japanese Unexamined Patent Publication No. 64-89871).

Meanwhile, in recent years, in addition to conventional analog broadcast, there are originated and rapidly popularized a BS (Broadcasting Satellite) digital broadcast capable of high-picture-quality and multi-channel broadcasting and a digital broadcast represented by the CS (Communications Satellite) digital broadcast. The digital broadcast, for example, in the broadcast according to the digital broadcasting standard ATSC (Advanced Television System Committee) of North America, is originated through a physical channel different from that for analog broadcast. Among these, there are many digital broadcasts originated from the same broadcasting station or the same system of broadcasting station as the prior art analog broadcasting station. In this case, in order to improve the operations of the users accustomed to these prior art channel numbers, the digital broadcast are administered so that the station can be selected and displayed through a virtual channel assigned the same channel numbers as the prior art analog broadcasting channel numbers.

In the digital broadcast, there have been assigned to each channel a carrier wave having a predetermined frequency band different from that for the analog broadcast. The channel is called a main channel, and one main channel includes a sub-channel to transmit one or a plurality of contents. The configuration of the sub-channels changes with a broadcasting time band, one of which is exemplified in FIG. 5 which shows a configuration of the sub-channels in a time band (8:00 PM to 12:00 PM) that has a main channel "4".

In FIG. 5, in broadcasting, sub-channels of Nos. 0 to 4 are selected for 8:00 to 9:00 PM, sub-channels of Nos. 0 and 1 are selected for 9:00 to 10:00 PM, sub-channels of Nos. 0 to 4 are selected for 10:00 to 11:00 PM, and sub-channels of Nos. 0 to 3 are selected for 11:00 to 12:00 PM. Among these, the sub-channel of No. 0 (physical channel number of 4-0) involves analog broadcast according to the NTSC (National Television Systems Committee) Standard, while the sub-channels of Nos. 1 to 4 (virtual channels Nos. 4-1 through 4-4) involve digital broadcast. Also, a TV program broadcast through the channel "4-0" is a prior art analog-broadcast one, an SD (Standard Definition) program broadcast through the channels "4-1" through "4-4" are digital broadcast standard-picture-quality one, and an HD (High Definition) program broadcast through the channel "4-1" is a digital broadcast high-picture-quality one.

In the digital broadcast, the information (hereinafter described as the channel information) on the channel configuration fluctuating as described above is transmitted together with the signals of image and the like. Therefore, in the digital broadcast receiving system, by receiving the above-mentioned digital signals by the tuner, decoding them by the digital decoder, and analyzing the VCT (Virtual Channel Table) included in the decoded signals, the channel information of the broadcast is allowed to be obtained, and thus the channel information is stored in memory, and the stored channel information is OSD displayed from display means such as CRT. Then, referring to the channel information thus OSD displayed, the user can easily perform channel selection.

However, as described above, the channel configuration in the digital broadcast frequently fluctuates, so that even for the channel the user saw and heard before, a case where no channel has been broadcasted occurs (see FIG. 5). In a conventional system, a display corresponding to such fluctuating channel configuration has not been made, and particularly a channel whose sub-channel cannot be identified could not be displayed distinguishing from the channel of the analog broadcast or of the digital broadcast whose channel configuration can be identified. If the channel information obtained before is read from a memory to OSD display, even a channel the user cannot see and hear will be displayed at that point due to the fluctuation in the channel configuration, and on the contrary, a channel having become audiovisual will be not displayed, thereby all the more confusing the user.

SUMMARY OF THE INVENTION

The present invention is made to solve the above-mentioned problems and it is an object of the invention to provide a broadcast receiving system in which even if a part (sub-channel) of the channel number is not determined, by displaying it using a descriptor without designating the undetermined sub-channel, the channel is plainly displayed to the user, thereby making the channel selection easy.

In order to achieve the above-mentioned object, according to one aspect of the present invention, a broadcast receiving system with a function of on-screen displaying a channel information on a display device comprises, an input device for inputting an operation instruction to the system, a receiver for receiving coded digital/analog broadcasting signals originated from a broadcasting station, a digital/analog decoder for decoding the digital/analog broadcasting signals received by the receiver and outputting them to an image-displaying display device connected to the system, a memory for storing the channel information included in the broadcasting signals decoded by the digital decoder, an on-screen display (hereinafter abbreviated as OSD) output circuit for making the display device to display a predetermined OSD, and a control unit for controlling the system, wherein the device receives digital broadcasting signals including one or a plurality of sub-channels for transmitting contents for one channel; characterized in that, the control unit controls the system such that; the receiver receives the broadcasting signals of a specified channel when the power switch of the system is closed, or in response to a channel change instruction inputted by the input device, the digital decoder decodes these broadcasting signals for analyzing the channel information from the decoded signals and for obtaining the channel information, the memory stores the information as storage data, the display device displays a channel selection display consisting of a list of the channel information including at least the channel specified by the user, digital/analog identification, and broadcasting contents in response to an instruction for displaying the channel selection display by the user, wherein the channel information includes the sub-channel number given a predetermined descriptor, when the channel information has not been analyzed and obtained in the current operation, and thus the sub-channel number cannot be designated based on the storage data stored in the memory.

In this configuration, the broadcasting signals in the digital broadcast include a sub-channel transmitting one or a plurality of contents for each channel. At first, when the user closes the power switch of this system, or inputs the instruction of channel change, the control unit makes the receiver to receive coded broadcasting signals, makes the digital decode member to decode the broadcasting signals, analyzes the coded signals to obtain the channel information including the information on the sub-channel configuration, and make the memory to store the channel information.

Then, when the user inputs an instruction for displaying the channel selection display from the list of the processing menu provided in this system, the list of the channel information including at least the channel specified by the user is OSD displayed on the display device. For example, as the list, there can be considered an example in which together with the channel specified by the user, a channel having a channel number before or after the specified channel number is made displayed. Here, for the channel specified by the user, the newest channel information has already been obtained by the above-mentioned analysis and stored in the memory, so that referring to the stored channel information, the control unit can make the above-mentioned list to display the newest channel information. For a channel in which the channel information in the current operation, that is, in the operation following the power switch closing this time (the newest channel information) has not been analyzed and obtained, the sub-channel number is not designated due to the current channel configuration being not clear, so that the presence of either of sub-channels is indicated to the user by giving a predetermined descriptor (for example, "x") as the sub-channel number to make the display device to OSD display the descriptor. For a channel in which the sub-channel configuration cannot be identified, assigning such descriptor to the channel allows it to be displayed distinguishing from the channel of the analog broadcast in which the sub-channel number is handled as "0." For this channel, the newest channel information has not been obtained, so that the above-mentioned contents may be not displayed.

Further, in the above-mentioned list, when the user specifies a channel to which the above-mentioned descriptor is given, the channel information on the channel is analyzed, the results are stored in the memory, and at the same time, the list of the channel information including the channel is OSD displayed on the display device. In this way, only the newest channel information designates the sub-channel to be OSD displayed, so that the user can perform station selecting and the like while seeing the list display of the channel information.

According to another aspect of the present invention, a broadcast receiving system with a function of on-screen displaying a channel information on a display device comprises, an input device for inputting an operation instruction to the system, a receiver for receiving coded digital broadcasting signals originated from a broadcasting station, a digital decoder for decoding the digital broadcasting signals received by the receiver and outputting them to an image-displaying display device connected to the system, a memory for storing the channel information included in the broadcasting signals decoded by the digital decoder, an on-screen display (hereinafter described as OSD) output circuit for making the display device to display a predetermined OSD, and a control unit for controlling the system, wherein the device receives digital broadcasting signals including one or a plurality of sub-channels for transmitting contents for one channel; characterized in that, the control unit controls the system such that; the display device displays a list of the channel information including at least the channel specified by the user, in response to a predetermined instruction by the user, wherein the channel information includes the sub-channel number given a predetermined descriptor when the sub-channel number cannot be designated. In this configuration, during receiving the digital broadcast, when the user inputs the instruction of the channel selecting, the list of the channel information including at least the channel specified by the user is OSD displayed on the display device. At this time, when the channel configuration is not clear and thus the number cannot be designated on the above-mentioned list, the control unit gives a predetermined descriptor as the sub-channel number to the channel and makes the display device to OSD display the channel. Further, in the above-mentioned list, when the channel to which the descriptor has been given is specified by the user, the channel information on the channel is analyzed, and the list of the channel information including the channel is OSD displayed on the display device. In this way, only the newest channel information designates the sub-channel to be OSD displayed, so that the user can perform station selecting and the like while seeing the list display of the channel information.

According to a further aspect of the present invention, in the above-mentioned system, the control unit may control the system such that the receiver receives the broadcasting signals of a specified channel when the power switch of the system is closed and a channel change instruction is inputted by the input device, thereafter the digital decoder decodes these broadcasting signals for analyzing the channel information from the decoded signals and for obtaining the channel information, and the memory stores the information as storage data. Thus, the channel information obtained in the current operation has been stored in the memory, so that referring to the stored channel information, the control unit can make the above-mentioned list to display the newest channel information.

BRIEF DESCRIPTION OF THE DRAWINGS

FIG. 3 is a view showing a channel selection display according to the system.

DETAILED DESCRIPTION OF THE PREFERRED EMBODIMENT OF THE PRESENT INVENTION

Figure 1:
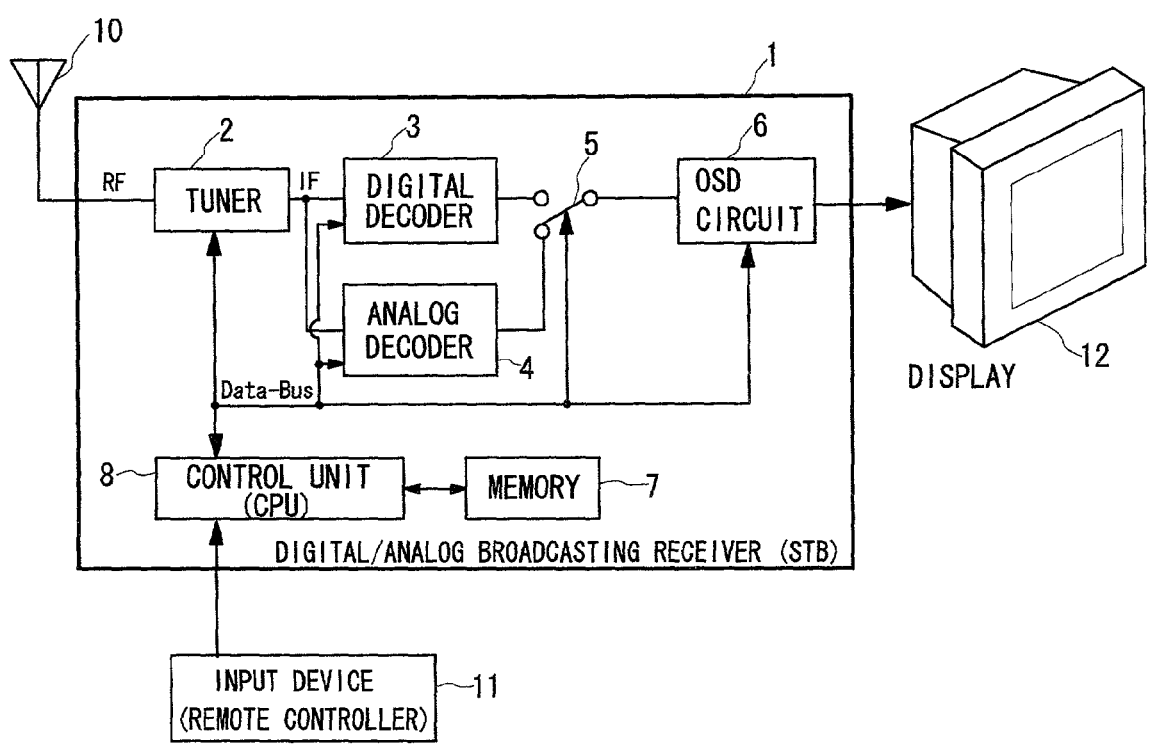
FIG. 1 is a block diagram of a broadcast receiving system according to one embodiment of the present invention.

With reference to the drawings, a digital/analog broadcast receiving system in connection with on embodiment embodying the present invention will be explained hereinafter. FIG. 1 shows a block diagram of a digital/analog broadcast receiving system (hereinafter called the present system). The present system 1 is a set top box (STB) which receives coded digital/analog broadcasting signals with high-frequency (RF) originated from a television broadcasting station through an antenna 10, and in response to the operation input of the channel information display from the user using an input device 11 such as a body button or a remote controller 30 shown in FIG. 2 later described, displays in a list the channel information receivable to a display device 12 for on-screen displaying the image signals included in the broadcasting signals.

The present system 1 includes a tuner 2 (receiver) for receiving digital/analog broadcasting signals present in a frequency band corresponding to a desired channel, a digital decoder 3 and an analog decoder 4 for decoding the digital/analog broadcasting signals received by the tuner 2, a switch 5 for switching the broadcasting signals decoded by the digital decoder 3 or the analog decoder 4, an on-screen display (hereinafter described as OSD) circuit 6 for making the display device 12 to display a predetermined OSD, a memory 7 for storing the transmitted frequency of each main channel or the channel configuration information in the digital broadcast, and a control unit 8 consisting of CPU for controlling each members of the present system.

The tuner 2 receives the supply of the digital/analog broadcasting signals received by the antenna 10, performs the station selecting operation in response to an instruction inputted into the control unit 8 from the input device 11, receives the digital/analog broadcasting signals present in a frequency band corresponding to a channel inputted, and modulates them to intermediate frequency (IF) to output to the digital decoder 3 and the analog decoder 4. The digital decoder 3 and the analog decoder 4 decode the broadcasting signals received by the tuner 2. The channel configuration in the digital broadcast is such that a frequency band different for each main channel is given, so that for a sub-channel in the same main channel, the broadcasting signals with the same frequency are transmitted. However, even for the digital broadcast having a virtual channel with the same number prefix as that for the analog broadcast, the physical channels are different from each other, so that the broadcasting signals are originated in a carrier wave of a different frequency band. When a channel selected by the user is a digital broadcasting channel (when the sub-channel is not "0"), the decoding processing is executed by the digital decoder 3. When a channel selected by the user is an analog broadcasting channel (when the sub-channel is "0"), the decoding processing is executed by the analog decoder 4.

The switch 5 receives an instruction from the control unit 8, and outputs the broadcasting signals decoded by either the digital decoder 3 or the analog decoder 4 to the OSD circuit 6. The OSD circuit 6 outputs the broadcasting signals to the display device 12 according to the instruction from the control unit 8, and outputs OSD display signals to display a predetermined list in respect to the receivable channel information. The memory 7 stores the information on the frequency band of each channel or the channel configuration information, and stores the information on the OSD display at the time of the factory-shipped present system.

The control unit 8 receives an input operation by the user using the input device 11 to execute various controls through the data bus, makes the memory 7 to store the information on the frequency band of each channel or the channel information received, and as required, refers to these information at the time of channel selecting and the like.

In particular, the control unit 8, when an image is displayed at the time of closing of the power switch of the present system 1, or when a channel is changed, makes the tuner 2 to receive the broadcasting signals of an applicable channel, analyzes VCT as the channel information obtained by decoding the broadcasting signals with the digital decoder 3, and thereby obtains status signals including therein. The status signals usually include all digital/analog sub-channel information in a virtual main channel. Therefore, selecting one sub-channel allows the channel information on all sub-channels in the main channel to be obtained, and if the channel information has been kept stored in the memory 7, then when selecting another sub-channel in the main channel, the setting efficiency of the channel utilized by the user can be improved by utilizing the storage data stored in the memory 7 without analyzing VCT. The control unit 8 makes the memory 7 to store the obtained status signals, thereby making the memory 7 to store the channel information.

The control unit 8, according to the selecting instruction of "channel selection menu" from the user, reads both the channel information on a main channel made stored in the memory 7 and specified by the user and the channel information on main channels before and after the main channel, and makes "channel selection display" shown in FIG. 3 later described to display these channel information therein. In this "channel selection display," for the main channel specified by the user, the channel information obtained by analyzing VTS at the time of the current operation of the present system 1 has been stored in the memory, so that the control unit 8, when reading the channel information, can make the display device 12 to OSD display the channel information showing the newest sub-channel configuration. Further, the control unit 8, for a main channel having not obtained the channel information at the time of the current operation of the present system 1, gives "main channel number-x" as the channel number to the main channel and makes the display device 12 to OSD display, thereby indicating the presence of either of sub-channels to the user.

Further, the control unit 8 decides whether a broadcasting signal is present based on the status signal, and makes the display device 12 to image output a predetermined OSD display or an image program of the broadcast selected. The display device 12 may employ the display of a television receiver, and may be a flat panel display device such as LCD (Liquid Crystal Display) and PDP (Plasma Display Panel), as well as CRT. The present system 1 includes a D/A converting circuit for converting digital signals to analog ones, though not shown, and the signals for the above-mentioned OSD display and image display are converted to analog signals by the D/A converting circuit, and then outputted to the display device 12. The above-mentioned D/A converting circuit may be configured to be contained in the display device 12. The digital signals, when displayed on the above-mentioned flat panel display, are outputted, as are kept unconverted, not through the D/A converting circuit.

Figure 2:
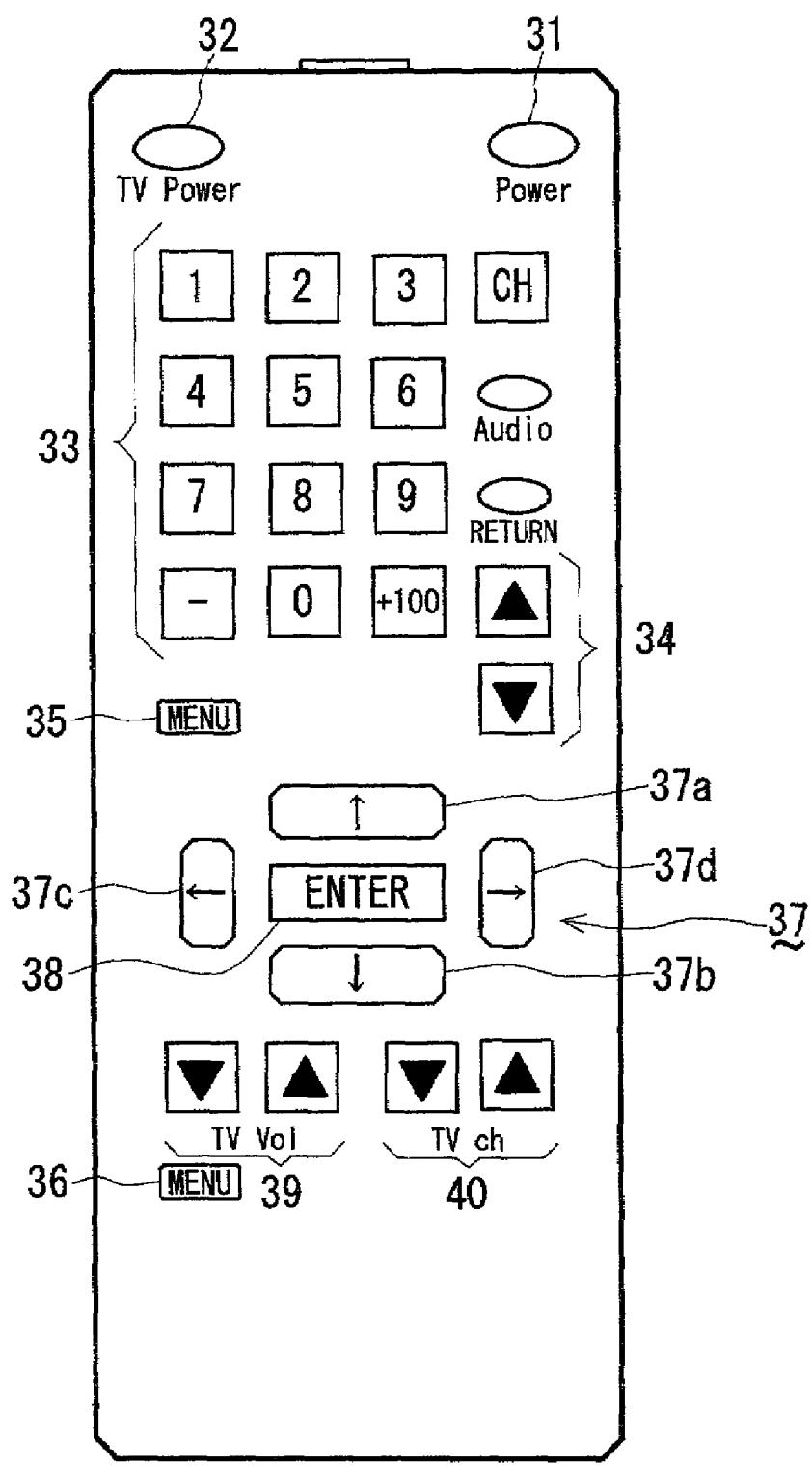
FIG. 2 is a plan view of a remote controller used for the system.

The input device 11 is a device for inputting an operation instruction by the user into the control unit 8. An example of the input device 11 is a remote controller 30 as shown in FIG. 2. The remote controller 30 is configured such that it can indicate the operation of the present system 1 and the television receiver by the use of infrared rays and the like.

That is, the controller includes power keys 31, 32 for turning on/off the power source of the present system 1 and the television receiver, ten keys 33 for inputting channel number of the present system 1, channel up/down keys 34 used for changing the channel, menu keys 35, 36 for calling the menu display of the present system 1 and the television receiver, direction keys 37 (37a through 37d) for shifting the cursor in a desired direction, an enter (ENTER) key 38 for defining an input, volume up/down keys 39 for adjusting the voice volume of the television receiver, and channel up/down keys 40 used for changing the channels of the television receiver.

Then, an example of "channel selection display" which is made displayed by the display device 12 will be shown in FIG. 3. The channel information is OSD displayed in such a manner that the user operates the menu key 35 on the remote controller 30 to give an instruction to the control unit 8 so as to make the display device 12 to display a menu list, and selects "channel selection menu" among the menus. Displayed in list on the display of the menu, as described above, are the channel information on a main channel specified by the user and the channel information before and after the main channel. Here, the above-mentioned before and after the main channel may be either the main channel before or after the main channel specified by the user. In FIG. 3, the channel "4" is specified by the user, and the channel "4" and the channel "2" as the main channel before it are OSD displayed on the display device 12. The main channel specified by the user is usually a channel which makes the display device 12 to display an image before selecting the menu, and however, may be a channel which is separately specified bye the user during the display of the menu display.

In this "channel selection display," as described above, for the main channel specified by the user, the channel information obtained by analyzing VTS at the time of the current operation of the present system 1 has been stored in the memory 7, so that the control unit 8, when reading the channel information, can make the display device 12 to OSD display the channel information showing the newest sub-channel configuration. Further, the control unit 8, for a main channel having not obtained the channel information at the time of the current operation of the present system 1, gives "main channel number -x" as the channel number to the main channel and makes the display device 12 to OSD display. In this way, even when the current sub-channel configuration cannot be identified, assigning a descriptor "x" to the sub-channel to display instead of specifically defining of the sub-channel number can make the display device 12 to display also the channel having not been recognized by the present system 1 (whose sub-channel number and the channel information are not determined) distinguishing from the channels (channels "4-1", "4-2") whose sub-channel configuration has been identified. Even when the main channel number is the digital broadcast common to the analog broadcast of NTSC and the sub-channel configuration cannot be identified, using the above-mentioned descriptor "x" to display a channel "2-x" allows the digital broadcast to be displayed distinguishing from the analog broadcast (channel "2-0"), thereby making easy the understanding of the channel configuration by the user.

Figure 4:
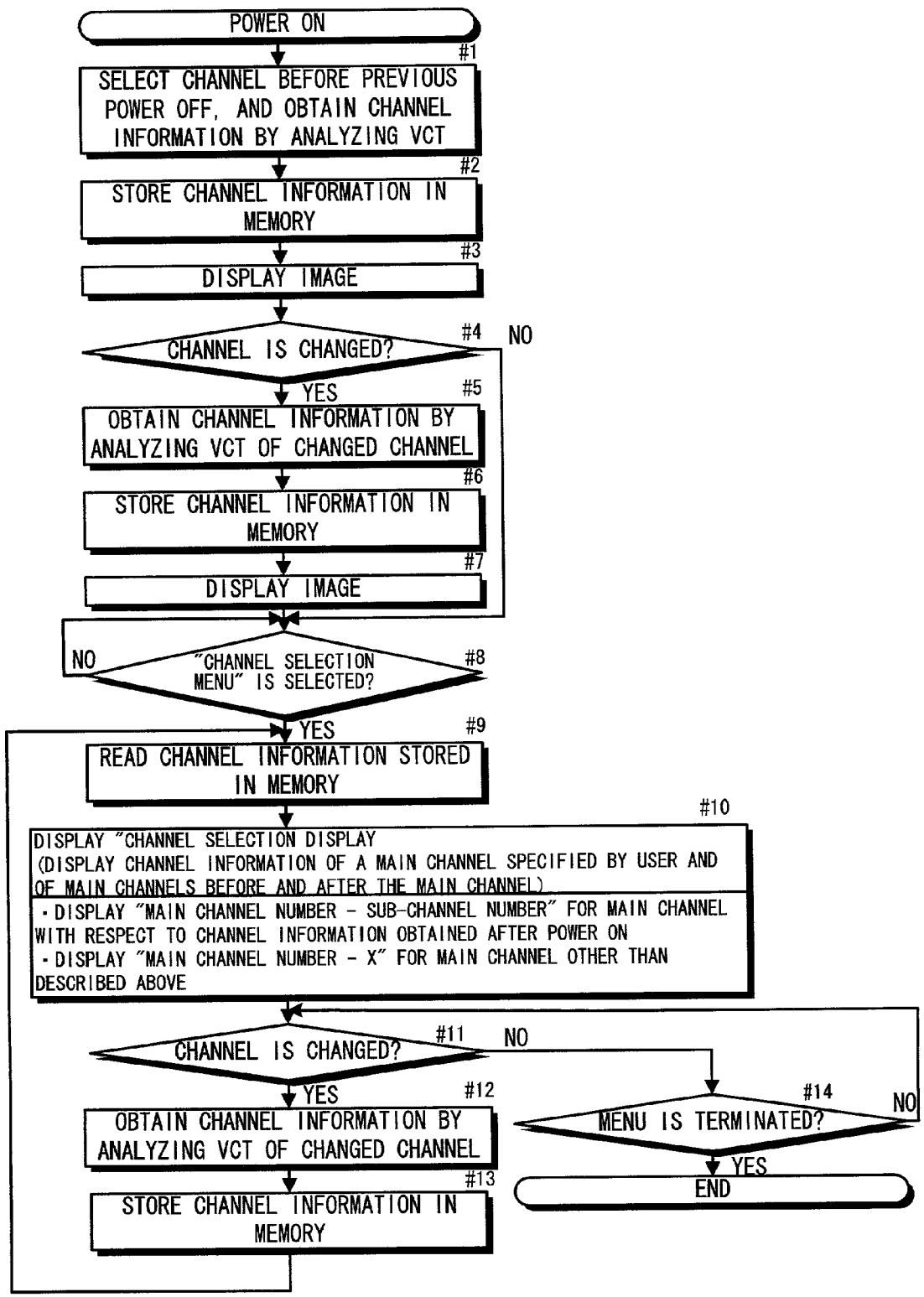
FIG. 4 is a flowchart of the operation by the control unit of the system.
Figure 5:
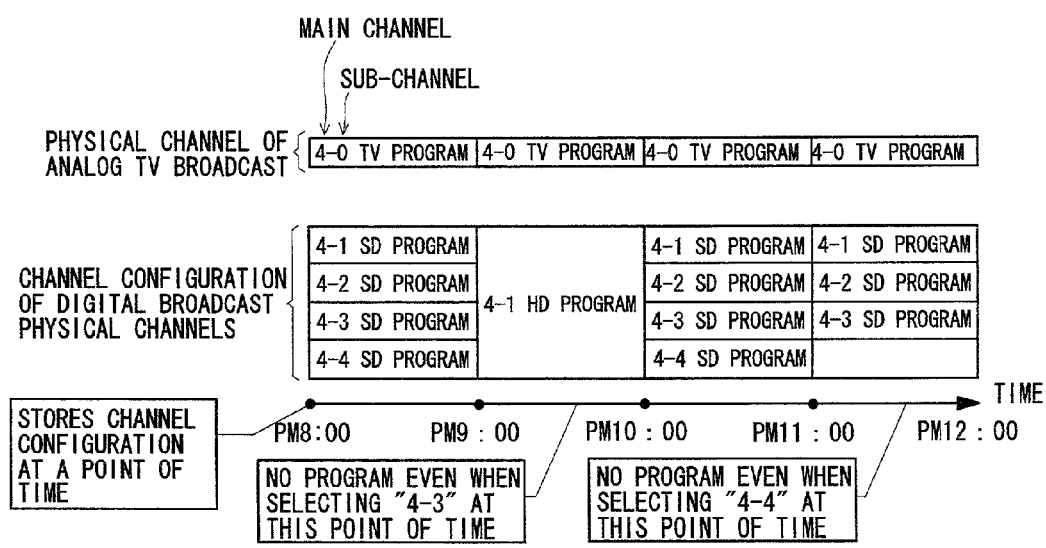
FIG. 5 is a view showing a channel configuration of the digital broadcast received by the system.

With reference to FIG. 4, the operation by the control unit 8 of the present system 1 when an instruction of the channel information list display is inputted from the user will be explained hereinafter. At first, when the power source of the system 1 is turned on, the control unit 8 makes the tuner 2 to select the channel having been selected at the last time before the previous power off, makes the digital decoder 3 to decode the received broadcasting signals so as to obtain the VCT, analyzes the VCT to obtain the channel information (#1), makes the memory 7 to store the channel information (#2), and makes the display device 12 to display an image (#3). Thereafter, when received an instruction of channel change from the user (YES at #4), the control unit 8 makes the tuner 2 to select the channel having received the change instruction, makes the digital decoder 3 to decode the received broadcasting signals so as to obtain the VCT, analyzes the VCT to obtain the channel information (#5), makes the memory 7 to store the channel information (#6), and makes the display device 12 to display an image of the changed channel (#7).

Thereafter, the control unit 8 waits for the selection of "channel selection menu" from the user (NO at #8), and when the menu is selected (YES at #8), reads the channel information having been stored in the memory 7 at # 2 and #6 (#9), and makes the display device 12 to display the channel selection display (#10). More specifically, the channel information on a main channel specified by the user (whose image is displayed at #3 or #7) and on the main channels before and after the main channel is displayed, and at that time, after power on, the main channel having obtained newly the channel information at #1 or #5 is made displayed as "main channel number—sub-channel number" as the channel number, and the channels other than mentioned above are made displayed as "main channel number -x."

Further, when the change of a channel selected in the "channel selection display" is instructed by the user (YES at #11), the control unit 8 makes the tuner 2 to select the channel having received the change instruction, makes the digital decoder 3 to decode the received broadcasting signals so as to obtain the VCT, analyzes the VCT included in the decoded signals to obtain the channel information (#12), makes the memory 7 to store the channel information (#13), and the operation returns to #9. When there is no channel change at #4 (NO at #4), the operation proceeds to #8. When the channel change instruction is not inputted at #11 (NO at #11), the operation proceeds to #14, and when the menu termination is inputted at #14 (YES at #14), the menu is terminated. On the other hand, when the menu termination is not inputted at #14 (NO at #14), the operation returns to #11 to wait for an input by the user. In this way, also for a channel whose sub-channel configuration is not identified, a descriptor "x" is assigned to the channel without defining the sub-channel to be displayed on the display, and when the user wants to know the above-mentioned sub-channel information, inputting the main channel at #11 allows the desired channel information to be displayed on the display, thereby making easy the channel selection by the user.

The present invention is not limited to the configuration of the above-mentioned embodiments, and various modifications can be made, and for example, the display in list of the channel information using the descriptor "x" is not limited to "channel selection display," but can be applied to a processing such as an addition/deletion of the channel information to/from the memory 7. At this time, using the descriptor "x" allows the main channel whose sub-channel cannot be designated to be displayed distinguishing from others, so that the user selects the main channel to easily perform the addition/deletion of the channel information to/from the memory 7.

In the present system 1, when with the operation of the remote controller 30 by the user during image displaying, for example, "4" is inputted as the channel number and is defined by the ENTER key 38 (when "4" and "ENTER" are inputted), that is, when the inputted channel number is only the sub-channel number, and the sub-channel is not specified, there may be displayed the image of a channel (for example "4-1") which has the highest broadcasting frequency and a higher possibility of being saw and heard among the main channels "4," or may be displayed "channel selection display" shown in FIG. 3. When the sub-channel has been specified, for example, when "4" and "ENTER" are inputted, the image of the virtual channel "4-1" may be displayed.

Further, without making the memory 7 to store the channel information obtained by analyzing of VCT, only the main channel having obtained the above-mentioned channel information during current operation may be OSD displayed with the sub-channel designated, and other channels be OSD displayed using the descriptor "x."

Further, the predetermined descriptor is not limited to "x," and those distinguishable from other sub-channels are not particularly limited. Still further, the present system 1 may be configured to be contained in the body of a television receiver or a video recorder.

According to the present invention, even when the channel configuration is frequently fluctuated, the newest channel configuration can be plainly displayed to the user. The user can also obtain easily desired channel information, and perform easily the channel selecting. From the display on which the channel information has been displayed in a list, the user can also perform, for example, a processing such as an addition/deletion of the channel information to/from the memory. When in the addition/deletion of the channel information, another sub-channel within the same main channel has been selected by the user, referring to the stored data without analyzing the VCT allows the processing efficiency to be improved.

What is claimed is:

1. A broadcast receiving system with a function of on-screen displaying channel information on a display device comprising:

an input device for inputting an operation instruction to the system, a receiver for receiving coded digital/analog broadcasting signals originated from a broadcasting station, a digital/analog decoder for decoding the digital/analog broadcasting signals received by the receiver and outputting them to an image-displaying display device connected to the system, a memory for storing the channel information included in the broadcasting signals decoded by the digital decoder, an on-screen display (OSD) output circuit for making the display device to display a predetermined OSD, and a control unit for controlling the system, wherein the device receives digital broadcasting signals including one or a plurality of sub-channels for transmitting contents for one channel;

wherein the control unit controls the system such that the receiver receives the broadcasting signals of a specified channel when the power switch of the system is closed, or in response to a channel change instruction inputted by the input device, the digital decoder decodes these broadcasting signals for analyzing the channel information from the decoded signals and for obtaining the channel information, the memory stores the information as storage data, the display device displays a channel selection display comprising a list of the channel information including at least the channel specified by the user, digital/analog identification, and broadcasting contents in response to an instruction for displaying the channel selection display by the user, wherein the channel information includes a predetermined descriptor in place of a sub-channel number when the channel information has not been analyzed and obtained in the current operation, and thus the sub-channel number cannot be designated based on the storage data stored in the memory.

2. A broadcast receiving system with a function of on-screen displaying a channel information on a display device comprising, an input device for inputting an operation instruction to the system, a receiver for receiving coded digital broadcasting signals originated from a broadcasting station, a digital decoder for decoding the digital broadcasting signals received by the receiver and outputting them to an image-displaying display device connected to the system, a memory for storing the channel information included in the broadcasting signals decoded by the digital decoder, an on-screen display (OSD) output circuit for making the display device to display a predetermined OSD, and a control unit for controlling the system, wherein the device receives digital broadcasting signals including one or a plurality of sub-channels for transmitting contents for one channel;

wherein the control unit controls the system such that the display device displays a list of the channel information including at least the channel specified by the user, in response to a predetermined instruction by the user, wherein the channel information includes a predetermined descriptor in place of a sub-channel number when the sub-channel number cannot be designated.

3. The broadcast receiving system with a function of on-screen displaying the channel information according to claim 2, wherein the control unit controls the system such that the receiver receives the broadcasting signals of a specified channel when the power switch of the system is closed and a channel change instruction is inputted by the input device, thereafter the digital decoder decodes these broadcasting signals for analyzing the channel information from the decoded signals and for obtaining the channel information, and the memory stores the information as storage data.

4. A method for displaying channel information on a display device, the method comprising the acts of:

receiving broadcast signals of a specified channel when a power switch is closed or in response to a channel change instruction;

analyzing channel information of the specified channel;

storing the channel information; and displaying a channel selection display comprising the channel information for the specified channel, wherein when channel information has not been analyzed for a particular channel, channel information for the particular channel is displayed with a sub-channel number with a predetermined descriptor, and wherein the sub-channel descriptor is displayed in place of a sub-channel number.

5. The method of claim 4, wherein the particular channel is a channel immediately preceding or following the specified channel.

6. The method of claim 4, wherein an analog channel corresponding to the specified channel is displayed with a sub-channel identification.

* * * * *